US012775514B2

(12) United States Patent
Ashkar et al.

(10) Patent No.: US 12,775,514 B2
(45) Date of Patent: Oct. 27, 2026

(54) METHODS AND DEVICES FOR DATA RECOVERY AFTER HANG DETECTION

(71) Applicant: ADVANCED MICRO DEVICES, INC., Santa Clara, CA (US)

(72) Inventors: Alexander Fuad Ashkar, Winter Park, FL (US); Harry J. Wise, Orlando, FL (US); Manu Rastogi, Casselberry, FL (US)

(73) Assignee: ADVANCED MICRO DEVICES, INC., Santa Clara, CA (US)

(*) Notice: Subject to any disclaimer, the term of this patent is extended or adjusted under 35 U.S.C. 154(b) by 0 days.

(21) Appl. No.: 18/785,178

(22) Filed: Jul. 26, 2024

(65) Prior Publication Data

US 2026/0030088 A1 Jan. 29, 2026

(51) Int. Cl.
*G06F 11/07* (2006.01)
*G06F 11/14* (2026.01)

(52) U.S. Cl.
CPC ...... *G06F 11/0778* (2013.01); *G06F 11/0721* (2013.01); *G06F 11/0757* (2013.01); *G06F 11/079* (2013.01); *G06F 11/0793* (2013.01); *G06F 11/1441* (2013.01); *G06F 2201/805* (2013.01)

(58) Field of Classification Search
CPC ............. G06F 11/0721; G06F 11/0757; G06F 11/0778; G06F 11/079; G06F 11/0793
See application file for complete search history.

(56) References Cited

U.S. PATENT DOCUMENTS

2006/0075276 A1* 4/2006 Kataria ............... G06F 11/1433 714/E11.135
2011/0320858 A1* 12/2011 Koktan ............... G06F 11/3466 714/2
2014/0052966 A1* 2/2014 Vahidsafa ............ G06F 11/076 712/E9.016
2016/0378587 A1* 12/2016 Zhang ................. G06F 11/0772 714/55
2017/0192838 A1* 7/2017 Jeong .................. G06F 11/0772
2018/0308209 A1* 10/2018 Ramadoss ............ G06F 9/4881
(Continued)

FOREIGN PATENT DOCUMENTS

KR 10-2017-0079368 A 7/2017

OTHER PUBLICATIONS

International Search Report and Written Opinion mailed Nov. 13, 2025 for International Application No. PCT/US2025/038096, 10 pages.

*Primary Examiner* — Bryce P Bonzo
*Assistant Examiner* — Albert Li

(57) ABSTRACT

A processing system includes a driver and an accelerated processing unit including a processor. The processor is configured to initiate a status check of wavefronts being executed by the accelerated processing unit responsive to receiving a status inquiry from the driver. Responsive to the status check indicating a hang, the processor is configured to employ a machine learning algorithm to selectively extract data from one or more registers of the accelerated processing unit. For example, in some cases, the one or more registers are local to one or more compute units of the accelerated processing unit. The processor is further configured to export the data from the accelerated processing unit prior to the accelerated processing unit being reset.

20 Claims, 5 Drawing Sheets

(56) References Cited

U.S. PATENT DOCUMENTS

| | | | | |
|---|---|---|---|---|
| 2019/0042348 | A1* | 2/2019 | Krithivas | G06F 11/0784 |
| 2019/0196816 | A1* | 6/2019 | Bajaj | G06F 9/3851 |
| 2019/0278651 | A1* | 9/2019 | Thornley | G06F 11/0787 |
| 2020/0133761 | A1* | 4/2020 | Paruthi | G06F 11/0751 |
| 2021/0311896 | A1 | 10/2021 | Kim et al. | |
| 2023/0017304 | A1 | 1/2023 | Barik et al. | |
| 2024/0012705 | A1 | 1/2024 | Lixingyu et al. | |

* cited by examiner

METHODS AND DEVICES FOR DATA RECOVERY AFTER HANG DETECTION

BACKGROUND

Some processing systems employ accelerated processing units (APUs) to execute wavefronts, or workloads, for one or more applications running on a central processing unit (CPU) of the processing system. These wavefronts include, for example, compute operations or graphics operations that include a respective series of instructions, also referred to herein as "threads," that are issued to the APU from the CPU. Compute operations include computations for machine learning, neural network, high-performance computing, or databasing, and graphics operations include those that cause the processing system to render an image for output via a display. In some cases, while executing wavefronts, the APU may experience a failure, or "hang," during which the APU becomes unresponsive and needs to be reset.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
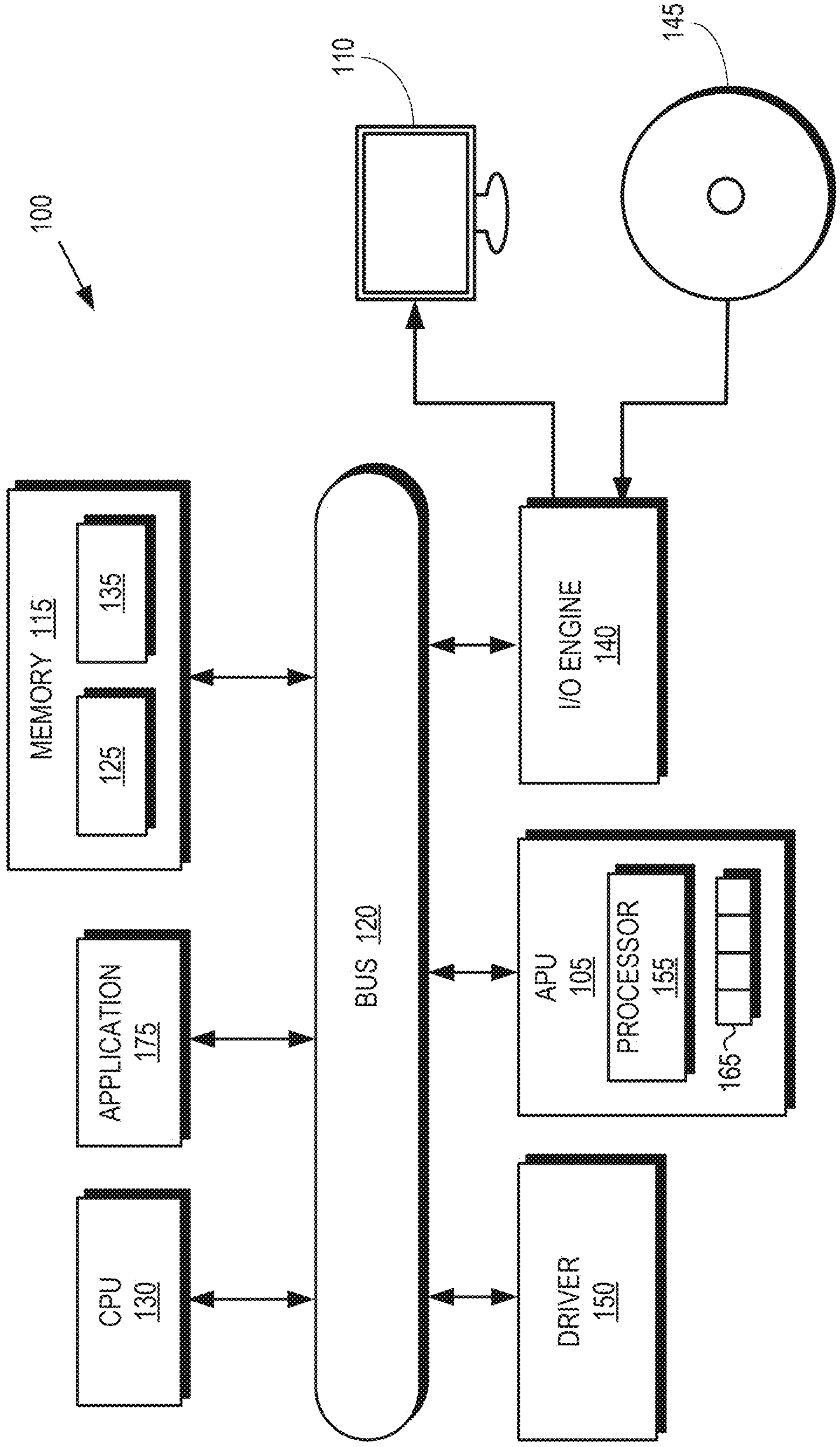
FIG. 1 is an example of a processing system configured to extract data from one or more registers of a processing pipeline in an accelerated processing unit (APU) responsive to detecting a hang in accordance with some embodiments.

In response to detecting a hang, conventional APUs typically dump data from an APU output buffer prior to triggering the APU reset. This data is analyzed by developers to help identify and debug the code that caused the hang. However, the ability to debug hangs in this manner is limited by the amount of information that the associated application or operating system (OS) can extract from the APU output buffer and export prior to the APU reset. FIGS. 1-5 show techniques to enhance the hang detection process by including a mechanism to extract and analyze data from the APU in real-time to obtain more detailed information about the cause of the hang prior to the APU reset. This information can then be used by developers to more efficiently diagnose the point of failure and debug the code.

To illustrate, in some embodiments, a processing system includes an accelerated processing unit (APU) and a corresponding driver that allows applications running on the processing system to utilize the APU to execute wavefronts. The APU includes a processor to initiate a status check of wavefronts being executed by a processing pipeline of the APU responsive to receiving a status inquiry from the driver. For example, in some embodiments, the driver issues the status inquiry in response to the expiration of a timer that the driver starts based on a last (or most recent) receipt of data from the APU. That is, the driver issues the status inquiry if the driver notices that the APU is not outputting data or is unresponsive. If there is no change in data being output by the APU or if the APU is unresponsive, the APU is determined to be in a "hang." Responsive to the status check indicating that the APU is in a hang condition, the processor employs a machine learning or heuristics-based algorithm to selectively extract data from one or more registers or other resources available within the accelerated processing unit. The one or more registers, for example, are local to one or more compute units in a processing pipeline of the APU. In some embodiments, the machine learning or heuristics-based algorithm employed by the processor is further configured to process or analyze the extracted data in real-time for more accurate crash reporting. The processor is then configured to export the data extracted from the one or more registers prior to the APU reset being triggered. By selectively extracting data from one or more registers associated with compute units in the processing pipeline of the APU or other readable registers of the APU, the processor generates more detailed information about the potential cause of the hang prior to the APU reset, thereby increasing the efficiency of the debug process such as reducing the time needed to resolve the cause of the hang. In addition, the processor is able to classify the hang to better identify the hangs in the field. This allows for better detection of hangs when the hangs are resolved with future driver updates.

In some embodiments, any of the elements, components, or blocks shown in the ensuing figures are implemented as one of software executing on a processor, hardware that is hard-wired (e.g., circuitry) to perform the various operations described herein, or a combination thereof. For example, one or more of the described blocks or components (e.g., the processor in the APU or other components associated with the techniques described herein) represent software instructions that are executed by hardware such as a digital signal processor (DSP), an application-specific integrated circuit (ASIC), a set of logic gates, a field programmable gate array (FPGA), a programmable logic device (PLD), a hardware accelerator, a graphics processing unit (GPU), a neural network (NN) accelerator, an artificial intelligence (AI) accelerator, or other type of hardcoded or programmable circuit.

FIG. 1 shows an example of a processing system 100 that includes an accelerated processing unit (APU) 105 with a processor 155 to extract and analyze data from a processing pipeline 165 in the APU 105 in real-time to obtain more detailed information about the cause of a hang in accordance with some embodiments. For example, in some cases, the processing pipeline 165 of the APU 105 includes a plurality of compute units (CUs) or processor cores that are configured to independently execute instructions of a wavefront concurrently or in parallel. In some cases, the wavefronts are associated with compute operations such as machine learning operations, and in other cases, the wavefronts are associated with graphics operations to render images intended for output to a display 110. The processing system 100 also includes a memory 115. Some embodiments of the memory 115 are implemented as a dynamic random access memory (DRAM). In other embodiments, the memory 115 is alternatively or additionally implemented using other types of memory including static random access memory (SRAM), nonvolatile RAM, and the like. In the illustrated embodiment, the APU 105 communicates with the memory 115 over a bus 120. However, some embodiments of the APU 105 communicate with the memory 115 over a direct connection or via other buses, bridges, switches, routers, and the like. The APU 105 executes instructions stored in the memory 115 and the APU 105 stores information in the memory 115 such as the results of the executed instructions. For example, the memory 115 can store a copy 125 of instructions from a program code that is to be executed by the APU 105.

The processing system 100 is generally configured to execute sets of instructions (e.g., computer programs) such as an application 175 to carry out specified tasks for an electronic device. Examples of such tasks include controlling aspects of the operation of the electronic device, performing computations associated with machine learning or databasing applications, displaying information to a user to provide a specified user experience, communicating with other electronic devices, and the like. Accordingly, in different embodiments the processing system 100 is employed in one of a number of types of electronic device, such as a desktop computer, laptop computer, server, game console, tablet, smartphone, and the like. In some cases, the processing system 100 may include more or fewer components than illustrated in FIG. 1. For example, the processing system 100 may additionally include one or more input interfaces, non-volatile storage, one or more output interfaces, network interfaces, and one or more displays or display interfaces.

The processing system 100 includes a central processing unit (CPU) 130 for executing instructions. Some embodiments of the CPU 130 include multiple processor cores (not shown in the interest of clarity) that independently execute instructions concurrently or in parallel. The CPU 130 is also connected to the bus 120 and therefore communicates with the APU 105 and the memory 115 via the bus 120. The CPU 130 executes instructions such as program code 135 stored in the memory 115 and the CPU 130 stores information in the memory 115 such as the results of the executed instructions. The CPU 130 is also able to initiate graphics processing by issuing draw calls to the APU 105 or initiate machine learning operations by issuing corresponding commands to the APU 105. A draw call is a command that is generated by the CPU 130 and transmitted to the APU 105 to instruct the APU 105 to render an object in a frame (or a portion of an object). Some embodiments of a draw call include information defining textures, states, shaders, rendering objects, buffers, and the like that are used by the APU 105 to render the object or portion thereof. The APU 105 renders the object to produce values of pixels that are provided to the display 110, which uses the pixel values to display an image that represents the rendered object.

An input/output (I/O) engine 140 handles input or output operations associated with the display 110, as well as other elements of the processing system 100 such as keyboards, mice, printers, external disks, and the like. The I/O engine 140 is coupled to the bus 120 so that the I/O engine 140 communicates with the APU 105, the memory 115, or the CPU 130. In the illustrated embodiment, the I/O engine 140 is configured to read information stored on an external storage medium 145. The external storage medium 145 stores information representative of program code used to implement an application such as a video game. The program code on the external storage medium 145 can be written to the memory 115 to form the copy 125 of instructions that are to be executed by the APU 105 or the CPU 130.

The driver 150 is a computer program that enables a higher-level computing program, such as from the application 175, to interact with the APU 105. For example, the driver 150 translates standard code received from the application 175 into a native format command stream understood by the APU 105. The driver 150 allows input from the application 175 to direct settings of the APU 105. Such settings include selection of a render mode, an anti-aliasing control, a texture filter control, a batch binning control, and deferred pixel shading control, for example. In some embodiments, the performance of the APU 105 is enhanced by the driver 150 choosing the appropriate mode or setting for the APU 105 to operate based on the instructions issued by the application 175 running on the CPU 130. In some cases, the driver 150 is updated via a software or firmware update to improve the performance, stability, and compatibility of the APU 105 with the various other components of the processing system 100.

In some embodiments, the APU 105 has a processing pipeline 165 that includes highly parallel processing capabilities to execute the workloads issued to it by the CPU 130 or the driver 150. For example, in the case of executing graphics operations, the processing pipeline 165 is a graphics pipeline that includes multiple stages configured for concurrent processing of different primitives in response to a draw call. Stages of the graphics pipeline in the APU 105 can concurrently process different primitives generated by an application, such as a video game. When geometry is submitted to the graphics pipeline, hardware state settings are chosen to define a state of the graphics pipeline. Examples of state include rasterizer state, a blend state, a depth stencil state, a primitive topology type of the submitted geometry, and the shaders (e.g., vertex shader, domain shader, geometry shader, hull shader, pixel shader, and the like) that are used to render the scene. The shaders that are implemented in the graphics pipeline state are represented by corresponding byte codes. In some cases, the information representing the graphics pipeline state is hashed or compressed to provide a more efficient representation of the graphics pipeline state. In other cases, the processing pipeline 165 is a compute processing pipeline configured to execute machine learning or neural network type operations. For example, the processing pipeline 165 is configured to implement a convolutional neural network (CNN) that receives input data at an input layer of the CNN, performs convolution operations on the input data to generate convolved data at one or more hidden layers of the CNN, and generates an output based on the convolved data via an output layer of the CNN.

In some embodiments, the processor 155 runs a Kernel Interactive Queue (KIQ) that is configured to receive a command stream from the CPU 130 via the driver 150. In some cases, the command stream indicates one or more wavefronts including groups of threads to be executed at the APU 105. As an example, based on the application 175 running on the processing system 100, the processor 155 receives a command stream indicating wavefronts including one or more threads that require compute operations such as matrix multiplication, addition, subtraction, and the like to be performed. As another example, based on the application 175 being a graphics application running on the processing system 100, the processor 155 receives a command stream indicating wavefronts including one or more threads that include draw calls for a scene to be rendered. After receiving a command stream, the processor 155 parses the command stream and issues respective instructions of the indicated wavefronts to other components of the APU 105 such as front-end circuitry or schedule circuitry (not shown for clarity purposes), which then provides the data indicating the threads of the wavefronts to be executed at the various compute units in the processing pipeline 165.

In some embodiments, one of the commands that the processor 155 receives from the driver 150 is a QUERY_STATUS packet, which is a packet that the driver 150 issues to query the state of the APU 105. In some cases, the driver 150 sends this packet in response to the expiration of a timer, such as a watch dog timer, that the driver 150 starts based on a last (or most recent) receipt of data from the APU 105. That is, the driver 150 issues the QUERY_STATUS packet (also referred to herein as a "status inquiry" or the like) if the driver 150 notices that the APU 105 is not outputting data or is unresponsive, a condition referred to herein as a "hang." In response to receiving the status inquiry from the driver 150, the processor 155 initiates the internal hang detection process by looking for progress of active wavefronts in the APU 105 over a period of time. For example, in some embodiments, the processor 155 samples data from one or more points along the processing pipeline 165. If the processor 155 does not detect progress of the wavefronts over multiple samplings, the processor 155 determines that the APU 105 is hung and employs a machine learning or heuristics-based algorithm to selectively extract data from one or more registers of one or more compute units in the processing pipeline 165. The one or more registers, for example, are local to one or more compute units in a processing pipeline 165 of the APU 105. In some embodiments, the machine learning or heuristics-based algorithm employed by the processor 155 is further configured to process the extracted data in real-time for more accurate crash reporting. For example, in some cases, the machine learning or heuristics-based algorithm employed by the processor 155 includes executing an embedded triage program to detect a point of failure (i.e., one or more compute units responsible for the hang) in the processing pipeline 165 or elsewhere in the APU 105 (e.g., in the processor 155, the front-end circuitry 202, the scheduler circuitry 204, or the acceleration circuitry 206 of the APU 105 in FIG. 2) and then data mine and export as much information from the point of failure prior to the APU reset being triggered. The processor 155 exports the data extracted from the one or more registers to the driver 150. By selectively extracting data from one or more registers associated with compute units in the processing pipeline 165 or from other readable registers (e.g., from a memory or a cache such as shared cache 230 of the APU 105 in FIG. 2) of the APU 105 in real-time, i.e., while the APU 105 is executing wavefronts and prior to the APU reset, the processor 155 generates more detailed information about the potential cause of the hang, which can then be used by developers to more quickly identify and resolve the issue.

Figure 2:
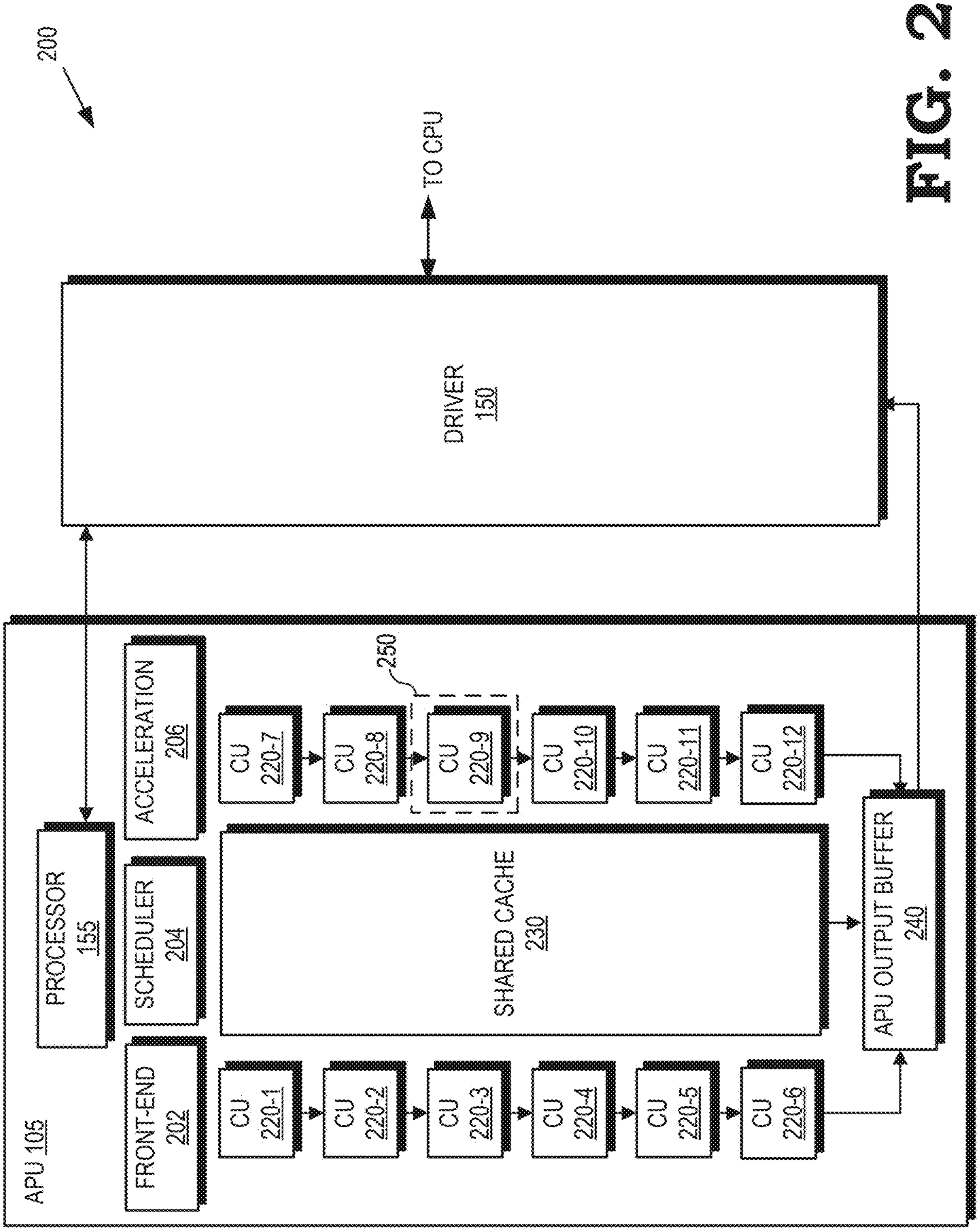
FIG. 2 is an example of an APU with a processor to extract and analyze data from one or more registers in a processing pipeline of the APU in accordance with some embodiments.

FIG. 2 shows an example diagram of a portion 200 of the processing system 100 of FIG. 1 in accordance with some embodiments. In the illustrated embodiment, the portion 200 of the processing system includes the driver 150 and the APU 105 that is configured to execute workloads for one or more applications, such as the application 175 of FIG. 1, running on a processing system, such as the processing system 100 of FIG. 1. In some embodiments, the applications include one or more of a compute application, a graphics application, or a combination thereof that issues respective sets of instructions (or threads) to a CPU, such as CPU 130 of FIG. 1, which then communicates the instructions to the APU 105 via the driver 150.

In the illustrated embodiment, the APU 105 includes the aforementioned processor 155 that is configured to receive a command stream, from a CPU via the driver 150, indicating one or more workgroups to be executed at the APU 105. After receiving the command stream, the processor 155 parses the command stream and issues respective instructions of the indicated workgroups to a front-end circuitry 202, a scheduling circuitry 204, or both. Based on the instructions of the workgroups received from the processor 155, the front-end circuitry 202, the scheduler circuitry 204, or both are configured to provide data indicating threads (e.g., operations) to be executed for these workgroups to a processing pipeline.

The APU 105 also includes a plurality of compute units (CUs) 220 configured to implement a processing pipeline, such as the processing pipeline 165 of FIG. 1. The scheduler circuitry 204, in one example, is configured to update one or more registers of one or more of the CUS 220 that is configured to execute a first group of waves of the workgroup. After the corresponding compute unit 220 has executed the first group of waves, scheduler circuitry 204 updates one or more registers of the compute unit 220 to schedule a second group of waves of the workgroup to be executed by the compute unit 220. To execute these waves, each compute unit is connected to a shared cache 230 that includes a volatile memory, non-volatile memory, or a combination thereof accessible by one or more compute units 220. The shared cache 230, for example, is configured to store data (e.g., register files, values, operands, instructions, variables) used in the execution of one or more waves, data resulting from the performance of one or more waves, or both. Because the shared cache 230 is accessible by multiple ones of the compute units 220, a first compute unit, e.g., compute unit 220-1, is enabled to provide results from the execution of a first wave to a second compute unit, e.g., compute unit 220-2, executing a second wave. Though the example embodiment presented in FIG. 2 shows the APU 105 as including 12 CUs (220-1 to 220-12), in other implementations, the APU 105 can include another number of compute units 220, e.g., 16, 32, or more compute units.

In the illustrated embodiment, the APU 105 includes an APU output buffer 240 configured to store data generated by the operations executed by the CUS 220 and output the data to the driver 150. Additionally, to help perform instructions for one or more workgroups, the APU 105 includes an acceleration circuitry 206. Such acceleration circuitry 206 includes hardware (e.g., fixed-function hardware) configured to execute one or more instructions for one or more workgroups. As an example, the acceleration circuitry 206 includes one or more instances of fixed function hardware configured to encode frames, encode audio, decode frames, decode audio, display frames, output audio, perform matrix multiplication, or any combination thereof. To schedule instructions for execution on such hardware, the scheduler circuitry 204 is configured to update one or more physical registers (not shown for clarity purposes) of the acceleration circuitry 206.

In some cases, while executing one or more threads of a wavefront, one or more of the compute units 220 may experience an error that results in a "hang" at the APU 105. In this sense, a hang refers to a situation where the APU 105 stops responding to commands from the OS or an application (such as the application 175 of FIG. 1). A hang can result from various reasons, including, for example, driver issues, elevated temperature, hardware faults, or software bugs. When a hang occurs, the APU 105 may become temporarily unresponsive until the APU 105 recovers or the APU 105 is reset. For example, in the illustrated embodiment, a point of failure 250 at compute unit 220-9 may result in a hang at the APU 105.

In response to a hang being detected, conventional processing units and drivers are configured to generate a debug report that provides information about the processing unit's operation and performance. These reports typically include timestamps and events recorded by the processing unit such as driver initialization, command transmissions, or errors, performance metric reports, and application contexts that describe contextual information about the application or software interacting with the processing unit when the error occurred. In many cases, conventional debug reports include a data dump that is exported from an output buffer of the processing unit. While such conventional methods provide information that is useful in the debug process, the ability to debug hangs in this manner is limited by the amount of information that the associated application or OS can extract from the processing unit and export prior to the processing unit reset.

In addition or in alternative to providing a data dump from the APU output buffer 240 in a debug report as done by conventional methods, the processor 155 of the APU 105 employs a mechanism to extract and analyze data from the CUs 220 in the processing pipeline of the APU 105 and other components of the APU having readable registers (e.g., in one or more of the processor 155, the front-end circuitry 202, the scheduler circuitry 204, the acceleration circuitry 206, or the shared cache 230) in real-time to obtain more detailed information about the cause of the hang prior to the APU reset. This information can then be used by developers to more efficiently diagnose the point of failure and debug the code. For example, in response to a hang being detected, the processor 155 employs a machine learning or heuristics-based algorithm to identify a point of failure in the processing pipeline and selectively extract data from one or more compute units associated with the point of failure. In the illustrated embodiment, the machine learning or heuristics-based algorithm employed by the processor 155 identifies that the CU 220-9 is a point of failure 250 in the processing pipeline. For example, the machine learning or heuristics-based algorithm employed by the processor 155 identifies the CU 220-9 as the point of failure 250 by monitoring the CUS 220 and locating the point of failure 250 based on the data flow in the processing pipeline implemented by the CUs 220. That is, the processor 155 monitors data flow through the CUs 220 and identifies that the CU 220-9 is not generating data as expected based on a wavefront being executed at the plurality of CUs 220.

In response to identifying the CU 220-9 as the point of failure 250, the machine learning or heuristics-based algorithm employed by the processor 155 selectively extracts data from the one or more registers of the CU 220-9. In some embodiments, the machine learning or heuristics-based algorithm employed by the processor 155 is further configured to process the extracted data in real-time for more accurate crash reporting. In addition, in some cases, after extracting the data from the registers of the CU 220-9, the machine learning or heuristics-based algorithm employed by the processor 155 is then configured to selectively extract data from one or more registers of adjacent CUs such as the CU 220-8 and the CU 220-10. That is, the machine learning or heuristics-based algorithm employed by the processor 155 implements a triage program that prioritizes selectively extracting and processing data from the CU 220-9 associated with the point of failure 250 and then the neighboring CUs 220-8, 220-10 over extracting data from the remaining ones of the CUs 220-1 to 220-7, 220-11, and 220-12. In this manner, the machine learning or heuristics-based algorithm employed by the processor 155 selectively extracts more detailed information relevant to the cause of the hang within the short time period available prior to the APU 105 being reset. The processor 155 is then configured to export the data extracted from the one or more registers in the CUs 220 to the driver 150. By selectively extracting data from one or more registers associated with CUs 220 in the processing pipeline of the APU 105, the processor 155 generates more detailed information about the potential cause of the hang prior to the APU reset.

Figure 3:
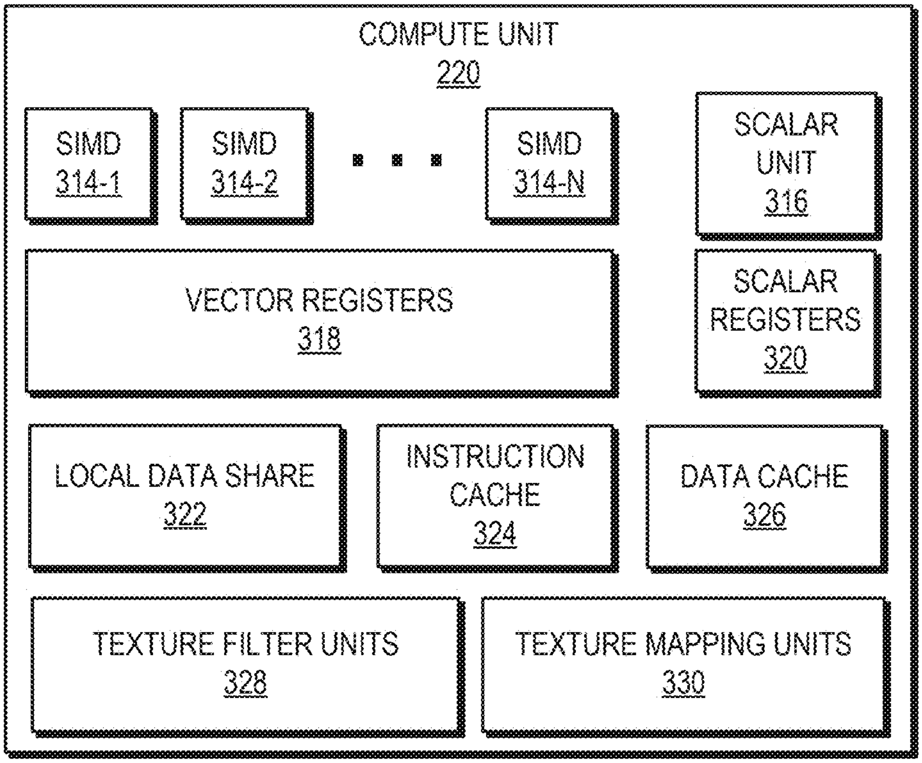
FIG. 3 is an example of a compute unit (CU) in a processing pipeline of an APU in accordance with some embodiments.

FIG. 3 shows an example of a compute unit (CU) 220, such as one corresponding to one of the CUs 220 of FIG. 2, in accordance with some embodiments. In the illustrated embodiment, the compute unit 220 includes one or more single instruction, multiple data (SIMD) units 314, a scalar unit 316, vector registers 318, scalar registers 320, a local data share 322, an instruction cache 324, a data cache 326, texture filter units 328, texture mapping units 330, or any combination thereof. A SIMD unit 314 (e.g., a vector processor) is configured to concurrently perform multiple instances of the same operation for a wavefront. For example, a SIMD unit 314 includes two or more lanes each including an arithmetic logic unit (ALU) each configured to perform the same operation for the threads of the wavefront. Though the example embodiment presented in FIG. 3 shows a compute unit 220 including three SIMD units (314-1, 314-2, 314-N) representing an N number of SIMD units, in other implementations, the compute unit 220 includes another number of SIMD units 314. Further, as an example, the size of a wavefront supported by the APU in which the CU 220 is implemented is based on the number of SIMD units 314 included in each compute unit 220. To determine the operations performed by the SIMD units 314, in some embodiments, each compute unit 220 includes vector registers 318 formed from one or more physical registers of the APU such as APU 105 of FIGS. 1 and 2. These vector registers 318 are configured to store data (e.g., operands, values) used by the respective lanes of the SIMD units 314 to perform a corresponding operation for the wavefront. Additionally, each compute unit 220 includes a scalar unit 316 configured to perform scalar operations for the wavefront. As an example, the scalar unit 316 includes an ALU configured to perform scalar operations. To support the scalar unit 316, in some cases, the compute unit 220 includes scalar registers 320 formed from one or more physical registers of APU. These scalar registers 320 store data (e.g., operands, values) used by the scalar unit 316 to perform a corresponding scalar operation for the wavefront.

In addition, in the illustrated embodiment, the compute unit 220 includes a local data share 322 formed from a volatile memory (e.g., random-access memory) accessible by each SIMD unit 314 and the scalar unit 316 of the compute unit 220. That is, the local data share 322 is shared across each wavefront concurrently executing on the compute unit 220. The local data share 322 is configured to store data resulting from the execution of one or more operations for one or more wavefronts, data (e.g., register files, values, operands, instructions, variables) used in the execution of one or more operations for one or more wavefronts, or both. As an example, the local data share 322 is used as a scratch memory to store results necessary for, aiding in, or helpful for the performance of one or more operations by one or more SIMD units 314. The instruction cache 324 of the compute unit 220, for example, includes a volatile memory, non-volatile memory, or both configured to store the instructions to be executed for one or more wavefronts to be executed by the compute unit 220. Further, the data cache 326 of the compute unit 220 includes a volatile memory, non-volatile memory, or both configured to store data (e.g., register files, values, operands, variables) used in the execution of one or more wavefronts by the compute unit 220. The instruction cache 324, the data cache 326, the shared cache 230 of FIG. 2, and a system memory, for example, are arranged in a hierarchy based on the respective sizes of the caches. As an example, based on such a cache hierarchy, the compute unit 220 first requests data from a controller of a corresponding data cache 326. Based on the data not being in the data cache 326, the data cache 326 requests the data from a shared cache (such as the shared cache 230 of FIG. 2) at the next level of the cache hierarchy. The caches then continue in this way until the data is found in a cache or requested from the system memory, at which point, the data is returned to the compute unit 220. Additionally, in some embodiments, the compute unit 220 includes one or more texture mapping units 330 each including circuitry configured to map textures to one or more graphics objects (e.g., groups of primitives) generated by the compute units 220. Further, in some embodiments, the compute unit 220 includes one or more texture filter units 328 each having circuitry configured to filter the textures applied to the generated graphics objects. For example, the texture filter units 328 are configured to perform one or more magnification operations, anti-aliasing operations, or both to filter a texture.

In some embodiments, in response to identifying the compute unit 220 as a point of failure after detecting a hang at the APU housing the compute unit 220, the processor (such as the processor 155 of FIGS. 1 and 2) of the APU is configured to extract data from one or more of the scalar registers 320, the vector registers 318, the local data share 322, the instruction cache 324, or the data cache 326 of the compute unit 220.

Figure 4:
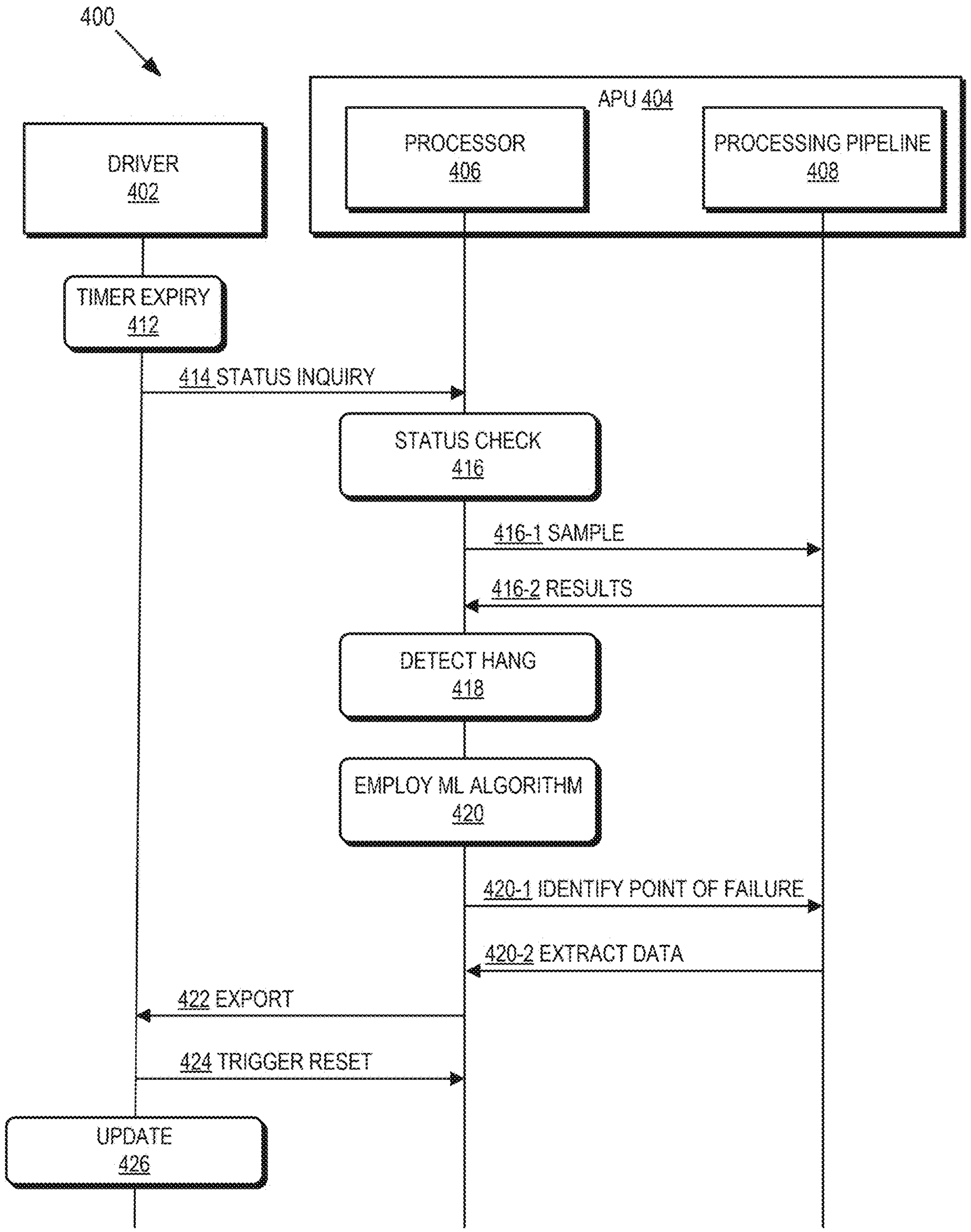
FIG. 4 is an example of a message sequence chart illustrating techniques for a processor in an APU to employ a machine learning (ML) algorithm to extract data from one or more registers in a processing pipeline of the APU in accordance with some embodiments.

FIG. 4 shows an example of a message sequence chart 400 illustrating a technique for a processor 406 in an APU 404 to employ a machine learning (ML) or heuristics-based algorithm (referred to herein as a "ML algorithm" for brevity) to extract data from one or more registers in a processing pipeline 408 of the APU 404 in accordance with some embodiments. In some cases, the APU 404 corresponds to the APU 105 of FIGS. 1 and 2, the processor 406 corresponds to the processor 155 of FIGS. 1 and 2, and the processing pipeline 408 corresponds to the processing pipeline 165 of FIG. 1 that is implemented by one or more of the compute units 220 of FIGS. 2 and 3. In addition, the driver 402 corresponds to the driver 150 of FIGS. 1 and 2.

At block 412, a timer initiated by the driver 402 expires to commence the process shown in message sequence chart 400. In some embodiments, the timer is initiated by the driver 402 based on a last or most recent data transmission received from the APU 404. That is, the expiration of the timer at block 412 indicates that the driver 402 has not received data from the APU 404 for a particular duration which may indicate that the APU 404 is hung. Responsive to the time expiring at block 412, the driver 402 sends a status inquiry 414 (e.g., a QUERY_STATUS packet) to the processor 406. In response to receiving the status inquiry 414 from the driver 402, the processor performs a status check 416 of the processing pipeline 408. The status check 416 is an internal hang detection mechanism employed by the processor 406 that includes looking for progress of active wavefronts being executed by the processing pipeline 408 over a time period. For example, in the illustrated embodiment, this process includes the processor 406 sampling 416-1 the processing pipeline 408 over a configurable time period and obtaining sampling results 416-2 from the processing pipeline 408. Based on the obtained results 416-2, the processor 406 is able to detect a hang at block 418. For example, if the processor 406 detects no progress in the active wavefronts from the results 416-2 over the multiple samplings 416-1, the processor 406 determines that the APU 404 is hung and employs a machine learning (ML) or heuristics-based algorithm at block 420. The ML or heuristics-based algorithm includes identifying a point of failure in the processing pipeline 420-1. For example, identifying a point of failure in the processing pipeline 420-1 includes monitoring the data generated by compute units in the processing pipeline 408 and detecting that one or more compute units in the processing pipeline are not generating data as expected based on a wavefront being executed at the plurality of CUs in the processing pipeline 408. Based on the identified point of failure at 420-1, the processor 406 extracts data 420-2 from the relevant registers of the compute units associated with the identified point of failure. The processor 406 then exports 422 the data extracted at 420-2 to the driver 402 prior to the driver 402 triggering a reset 424 of the APU 404. In some embodiments, at some point after receiving the exported data 422, the driver 402 can optionally receive an update 426 which includes a software or firmware update to resolve the issue that caused the hang.

In the illustrated embodiment, the processor 406 employs the ML algorithm 420 after the hang is detected at block 418. In other embodiments, the processor 406 employs the ML algorithm 420 concurrent with the status check at block 416 and hang detection at block 418. That is, in some embodiments, the processor 406 initiates the identification of the point of failure 420-1 in response to receiving the status inquiry 414. For example, the processor 406 performs the sampling 416-1 of the processing pipeline 408 (e.g., by sampling the output of the processing pipeline) concurrent with the processor 406 identifying the point of failure 420-1 in the processing pipeline 408 by monitoring the data in the registers of the CUs in the processing pipeline 408.

Figure 5:
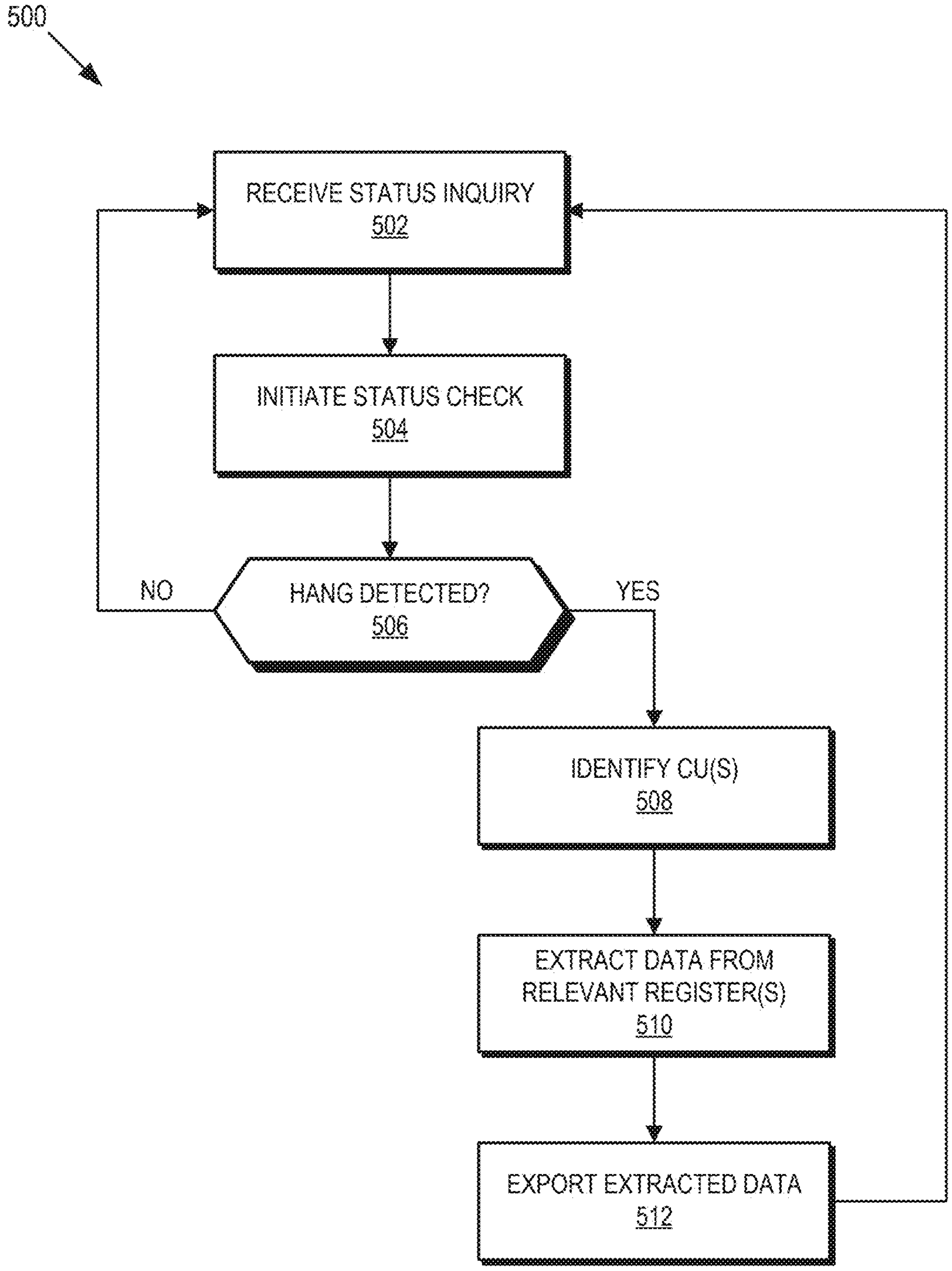
FIG. 5 is a flow chart illustrating a method to extract data from one or more registers in a processing pipeline of an APU in accordance with some embodiments.

FIG. 5 shows an example of a flow chart 500 illustrating a method for a processor, such as the processor 155 of FIGS. 1 and 2, to employ a machine learning (ML) or heuristics-based algorithm (referred to herein as a "ML algorithm" for brevity) to extract data from one or more registers of one or more compute units of a plurality of compute units in an APU, such as the APU 105 of FIGS. 1 and 2 in accordance with some embodiments. In some cases, the compute units implement a processing pipeline in the APU.

At block 502, the processor receives a status inquiry. In some cases, the status inquiry is a QUERY_STATUS packet received from a driver associated with the APU that the processor is implemented within.

At block 504, in response to receiving the status inquiry, the processor initiates a status check of the APU. For example, the status check is an internal hang detection process that includes monitoring the progress of active shader wavefronts through the processing pipeline of the APU. In some cases, this includes the processor taking multiple samplings at one or more points (e.g., the end) of the processing pipeline over a period of time and determining whether progress has been made based on the results of the samplings.

At block 506, the processor detects whether a hang has occurred responsive to the status check at block 504. For example, the processor detects a hang has occurred if no active wavefront progress is made over the multiple samplings which indicates that the processing of the wavefront has stalled.

Responsive to detecting that a hang has occurred (i.e., YES at block 506), the processor employs an ML algorithm to identify the one or more compute units (CUs) in the processing pipeline of the APU or another APU component (e.g., one or more of the processor 155, the front-end circuitry 202, the scheduler circuitry 204, the acceleration circuitry 206, or the shared cache 230 of the APU 105 in FIG. 2) responsible for the hang at block 508. For example, in some cases, this includes the processor monitoring the output of the CUs in the processing pipeline and identifying the one or more CUS responsible for the hang based on the monitored output of the CUs. Once the one or more CUs are identified at block 508, the processor employs the ML algorithm to selectively extract data from one or more relevant registers associated with the one or more identified CUs at block 510. For example, in some cases, this includes extracting data from one or more of the vector registers 318, scalar registers 320, local data share 322, instruction cache 324, and/or data cache 326 of the compute unit 220 of FIG. 3. In some embodiments, in addition to first prioritizing the extraction of data from the relevant registers of the one or more CUs identified at block 508 (referred to herein as a "first stage"), the ML algorithm next prioritizes the extraction of data from the registers of CUs that are adjacent to or neighbor the identified CUs (referred to herein as a "second stage"). As such, in some cases, the processor employs the ML algorithm to selectively extract data from the CUs in a hierarchical manner centered around the CUs identified as being the potential cause of the hang. The first stage of the hierarchy includes first extracting data from the CUs identified as causing the hang, and the second stage of the hierarchy includes next extracting data from neighboring or adjacent CUs, and so on.

In some embodiments, in addition to extracting the data from the relevant registers at block 510, the ML algorithm processes the data in real-time to gather further information about the nature of the hang and data mine the information. In this manner, the process employs the ML algorithm to maximize the acquisition of information from the live processing pipeline in the APU that can be reported back to the driver or the OS prior to the APU reset. At block 512, the processor exports the extracted data from the APU. In some embodiments, this includes exporting the extracted data from the APU to an application or OS running on a CPU via a driver prior to the driver triggering the APU reset.

In the embodiment illustrated in FIG. 5, the processor identifies the CU(s) in the processing pipeline of the APU or the other APU component responsible for the hang at block 508 after the hang is detected at block 506. In other embodiments, the processor initiates the identification of the CU(s) or the other APU component in response to receiving the status inquiry at block 502, i.e., the processor performs initiating of the status check at block 504 and the identification of the CU(s) or the other APU component concurrently. In this manner, the processor detects the hang in the APU and identifies the CU(s) or the other APU component that contributed to the cause of the hang concurrently, thereby streamlining the process and maximizing the amount of data that can be extracted from the relevant registers prior to the APU being reset.

Thus, the apparatuses and techniques described herein enhance the hang detection process by employing a machine learning or heuristics-based algorithm at a processor in the APU to extract and analyze data from the processing pipeline in the APU in real-time to obtain more detailed information about the cause of a hang. In some cases, the CU-focused data extraction techniques described herein are implemented complementary to brute force debug dumps because it allows for an internal processor of the APU to provide more focused and additional information in the data extracted from the APU responsive to a hang being detected. This in turn helps developers understand the nature of the hang to allow for quicker issue resolution.

In some embodiments, the apparatus and techniques described above are implemented in a system including one or more integrated circuit (IC) devices (also referred to as integrated circuit packages or microchips), such as the APUs described above with reference to FIGS. 1-5. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disk, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the computer system via a wired or wireless network (e.g., network accessible storage (NAS)).

In some embodiments, certain aspects of the techniques described above may be implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

One or more of the elements described above is circuitry designed and configured to perform the corresponding operations described above. Such circuitry, in at least some embodiments, is any one of, or a combination of, a hard-coded circuit (e.g., a corresponding portion of an application specific integrated circuit (ASIC) or a set of logic gates, storage elements, and other components selected and arranged to execute the ascribed operations) or a programmable circuit (e.g., a corresponding portion of a field programmable gate array (FPGA) or programmable logic device (PLD)). In some embodiments, the circuitry for a particular element is selected, arranged, and configured by one or more computer-implemented design tools. For example, in some embodiments the sequence of operations for a particular element is defined in a specified computer language, such as a register transfer language, and a computer-implemented design tool selects, configures, and arranges the circuitry based on the defined sequence of operations.

Within this disclosure, in some cases, different entities (which are variously referred to as "components," "units," "devices," "circuitry, etc.) are described or claimed as "configured" to perform one or more tasks or operations. This formulation-[entity] configured to [perform one or more tasks]—is used herein to refer to structure (i.e., something physical, such as electronic circuitry). More specifically, this formulation is used to indicate that this physical structure is arranged to perform the one or more tasks during operation. A structure can be said to be "configured to" perform some task even if the structure is not currently being operated. A "memory device configured to store data" is intended to cover, for example, an integrated circuit that has circuitry that stores data during operation, even if the integrated circuit in question is not currently being used (e.g., a power supply is not connected to it). Thus, an entity described or recited as "configured to" perform some task refers to something physical, such as a device, circuitry, memory storing program instructions executable to implement the task, etc. This phrase is not used herein to refer to something intangible. Further, the term "configured to" is not intended to mean "configurable to." An unprogrammed field programmable gate array, for example, would not be considered to be "configured to" perform some specific function, although it could be "configurable to" perform that function after programming. Additionally, reciting in the appended claims that a structure is "configured to" perform one or more tasks is expressly intended not to be interpreted as having means-plus-function elements.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A processor configured to:

initiate a status check of wavefronts being executed by a plurality of compute units in a processing pipeline of an accelerated processing unit; and responsive to the status check indicating a hang, employ a machine learning algorithm to selectively extract data from one or more registers of one or more compute units of the plurality of compute units in the processing pipeline that are identified as being responsible for the hang.

2. The processor of claim 1, wherein the one or more registers are local to the one or more compute units.

3. The processor of claim 1, further configured to:

export the data from the accelerated processing unit prior to a reset of the accelerated processing unit being triggered.

4. The processor of claim 1, wherein selectively extracting the data from the one or more registers comprises:

identifying the one or more compute units of the plurality of compute units in the processing pipeline of the accelerated processing unit responsible for the hang; and extracting data from the one or more registers of the one or more compute units.

5. The processor of claim 4, wherein the identifying of the one or more compute units of the plurality of compute units in the processing pipeline of the accelerated processing unit responsible for the hang comprises monitoring an output of each compute unit of the plurality of compute units.

6. The processor of claim 5, wherein the output of the one or more compute units is indicative that the one or more compute units are responsible for the hang.

7. The processor of claim 4, wherein selectively extracting data from the one or more registers of the accelerated processing unit comprises, in a first stage, prioritizing extracting data from the one or more registers of the one or more compute units in the processing pipeline over other registers associated with other compute units of the plurality of compute units in the processing pipeline.

8. The processor of claim 7, wherein selectively extracting data from the one or more registers of the accelerated processing unit comprises, in a second stage after the first stage, prioritizing extracting data from registers of neighboring compute units of the one or more compute units in the processing pipeline over registers from remaining compute units of the plurality of compute units in the processing pipeline.

9. The processor of claim 1, wherein the status check comprises sampling an output of the accelerated processing unit over a period of time.

10. The processor of claim 1, further configured to:

initiate the status check responsive to receiving a status inquiry from a driver associated with the accelerated processing unit in response to a timer expiring, the timer triggered based on a last receipt of data by the driver from the accelerated processing unit.

11. A processing system comprising:

a driver; and an accelerated processing unit comprising a processor configured to:

initiate a status check of wavefronts being executed by a plurality of compute units in a processing pipeline of the accelerated processing unit responsive to receiving a status inquiry from the driver;

responsive to the status check indicating a hang, employ a machine learning algorithm to selectively extract data from one or more registers of one or more compute units of the plurality of compute units in the processing pipeline that are identified as being responsible for the hang; and export the data from the accelerated processing unit.

12. The processing system of claim 11, the driver configured to:

initiate a timer based on a last receipt of data from the accelerated processing unit; and send the status inquiry to the accelerated processing unit responsive to the timer expiring.

13. The processing system of claim 11, the accelerated processing unit configured to export the data from the accelerated processing unit to the driver prior to the driver initiating a reset of the accelerated processing unit.

14. The processing system of claim 11, wherein selectively extracting the data from the one or more registers comprises:

identifying the one or more compute units of the plurality of compute units in the processing pipeline of the accelerated processing unit responsible for the hang; and extracting data from the one or more registers of the one or more compute units.

15. The processing system of claim 14, wherein the identifying of the one or more compute units of the plurality of compute units in the processing pipeline of the accelerated processing unit responsible for the hang comprises monitoring an output of each compute unit of the plurality of compute units, wherein the output of the one or more compute units is indicative that the one or more compute units are responsible for the hang.

16. The processing system of claim 15, wherein selectively extracting data from the one or more registers of the accelerated processing unit comprises, in a first stage, prioritizing extracting data from the one or more registers of the one or more compute units in the processing pipeline over other registers associated with other compute units of the plurality of compute units in the processing pipeline.

17. The processing system of claim 16, wherein selectively extracting data from the one or more registers of the accelerated processing unit comprises, in a second stage after the first stage, prioritizing extracting data from registers of neighboring compute units of the one or more compute units in the processing pipeline over registers from remaining compute units of the plurality of compute units in the processing pipeline.

18. The processing system of claim 11, the driver configured to be updated based on the data exported from the accelerated processing unit.

19. A method comprising:

initiating, by a processor, a status check of wavefronts being executed by a plurality of compute units in a processing pipeline of an accelerated processing unit; and responsive to the status check indicating a hang, employing, by the processor, a machine learning algorithm to selectively extract data from one or more registers of one or more compute units of the plurality of compute units in the processing pipeline that are identified as being responsible for the hang.

20. The method of claim 19, wherein selectively extracting the data from the one or more registers comprises:

identifying the one or more compute units of the plurality of compute units in the processing pipeline of the accelerated processing unit responsible for the hang; and extracting data from the one or more registers of the one or more compute units.

* * * * *